(12) United States Patent
Kenworthy

(10) Patent No.: US 12,278,715 B2
(45) Date of Patent: Apr. 15, 2025

(54) VECTOR CHANNEL ANALYZER

(71) Applicant: ASTRONICS TEST SYSTEMS, INC., Orlando, FL (US)

(72) Inventor: Gary Robert Kenworthy, Leesburg, FL (US)

(73) Assignee: ASTRONICS TEST SYSTEMS, Orlando, FL (US)

( * ) Notice: Subject to any disclaimer, the term of this patent is extended or adjusted under 35 U.S.C. 154(b) by 36 days.

(21) Appl. No.: 18/198,366

(22) Filed: May 17, 2023

(65) Prior Publication Data

US 2023/0388154 A1 Nov. 30, 2023

Related U.S. Application Data

(60) Provisional application No. 63/345,267, filed on May 24, 2022.

(51) Int. Cl.
*H04L 25/02* (2006.01)
*H04B 17/15* (2015.01)

(52) U.S. Cl.
CPC ......... *H04L 25/0212* (2013.01); *H04B 17/15* (2015.01); *H04L 25/022* (2013.01)

(58) Field of Classification Search
CPC .... H04B 17/0085; H04B 17/13; H04B 17/15; H04B 17/201; H04B 17/21; H04B 17/23; H04B 17/225; H04B 17/29; H04B 17/336; H04L 25/0212; H04L 25/022; H04L 25/0262

USPC .............. 375/224–228; 324/750.01, 750.02, 324/750.15, 750.18, 750.19; 702/69, 109, 702/117, 124–126

See application file for complete search history.

(56) References Cited

U.S. PATENT DOCUMENTS

| | | | |
|---|---|---|---|
| 10,897,316 B1* | 1/2021 | Feilen | H04B 17/0085 |
| 2012/0243595 A1* | 9/2012 | Anderson | H04B 17/0085 455/313 |
| 2016/0103197 A1* | 4/2016 | Schultz | G01R 27/32 324/601 |
| 2016/0285571 A1* | 9/2016 | Badiu | H04L 25/0224 |
| 2021/0263088 A1* | 8/2021 | Held | G01R 27/28 |
| 2023/0305056 A1* | 9/2023 | Celik | G01R 31/31908 |

* cited by examiner

*Primary Examiner* — Young T. Tse
(74) *Attorney, Agent, or Firm* — Pauley Erickson & Swanson

(57) ABSTRACT

A system and method for measuring characteristics of a signal transmission channel. A generator generates a defined signal as a function of user defined reference parameters, and injects the defined signal into an input of the signal transmission channel. An analyzer receives the defined signal from an output of the signal transmission channel. The analyzer also includes the user defined reference parameters, and measures a reference delay and reference frequency offset without any timing or phase reference synchronization with the generator. The analyzer computes a time-dependent (impulse response) and/or frequency-dependent (frequency response) variation of a response of the signal transmission channel relative to the reference delay and reference frequency offset.

19 Claims, 2 Drawing Sheets

VECTOR CHANNEL ANALYZER

CROSS REFERENCE TO RELATED APPLICATION

This application claims the benefit of U.S. Provisional Patent Application Ser. No. 63/345,267, filed on 24 May 2022. The co-pending provisional application is hereby incorporated by reference herein in its entirety and is made a part hereof, including but not limited to those portions which specifically appear hereinafter.

BACKGROUND OF THE INVENTION

This invention relates generally to measuring signal transmission characteristics and, more particularly, to an apparatus or system and method for analyzing signal transmission characteristics of a channel.

Vector Network Analyzers or VNAs are test instruments used to characterize RF signal channels and networks. VNAs are sometimes called gain-phase meters as they characterize both the magnitude and phase response of a network (as opposed to Scalar Network Analyzers or SNAs which only measure magnitude). The basic operation of a VNA is to compare the magnitude and phase received from a device under test with the signal injected into the device. Thus VNAs require a reference connected to the device input in order to do channel analysis for a device under test. In practice, this means that the analysis performed by the VNA must have simultaneous access to both the injected signal and received signal. This is represented in FIG. 1 with the VNA as a single module both injecting and receiving the test signal. The internal connection between the reference signal input and the signal receiver provides a time/phase reference to allow phase measurement. This can limit the usefulness in particular situations where such communication is not easily available, such as networks of channels that span long distances. There is a continued need for improved channel analysis devices.

SUMMARY OF THE INVENTION

A general object of the invention is to provide an apparatus or system, referred to herein as a Vector Channel Analyzer (VCA) that measures signal transmission characteristics of a channel by analyzing the signal received at the output of a channel and comparing it to the signal injected into the channel input. Unlike existing instruments such as a Vector Network Analyzer (VNA), the VCA of embodiments of this invention does not require a connected reference to do the channel analysis. Instead, in embodiments, the VCA desirably uses a specially constructed stimulus source in combination with robust, precision alignment techniques to measure both magnitude and phase characteristics of the channel without a connected reference.

The ability to use separate equipment for the source and analysis with the VCA allows far greater measurement flexibility in situations such as where the device or system being measured spans large distances, includes substantial delay, or includes frequency shifting. An example of a particularly useful application is when the channel to be measured includes a digital block such as a software-defined radio. The VCA can either measure the characteristics of a channel that includes a digital block or be embedded into the digital processing of the SDR as the source and/or analysis.

The general object of the invention can be attained, at least in part, through a system and method for measuring characteristics of a signal transmission channel. The system and method includes: receiving user defined reference parameters at a generator connectable with the signal transmission channel; receiving the same user defined reference parameters at an analyzer connectable with the signal transmission channel; the generator constructing a defined signal as a function of the reference parameters; the generator injecting the defined signal into an input of the signal transmission channel; receiving an output signal with the analyzer at an output of the signal transmission channel; determining a reference delay and/or a reference frequency offset for the output signal at the analyzer without any timing or phase reference connection with the generator; the analyzer computing the transfer function of the signal transmission channel, represented as time-dependent and/or frequency-dependent characteristics of the signal transmission channel, calculated with respect to the reference delay and the reference frequency offset; and displaying or recording results of the computing. Exemplary reference parameters include frequency span and resolution. Reference parameters may also include a more detailed specification, up to and including a full specification of the magnitude and phase characteristics of the signal.

The invention further includes a system for measuring characteristics of a signal transmission channel that includes a generator configured to: generate a defined signal as a function of user defined reference parameters; and inject the defined signal into an input of the signal transmission channel. The system further incudes an analyzer configured to: receive the defined signal from an output of the signal transmission channel, wherein the analyzer includes the user defined reference parameters; measure a reference delay and reference frequency offset without any timing or phase reference synchronization with the generator; and compute a time-dependent and/or frequency-dependent variation of a response of the signal transmission channel relative to the reference delay and reference frequency offset. The system can include or be connected to a display and/or recording device to receive results of the analyzer computations.

In embodiments of the invention, the defined signal includes a repeating fixed frame in the time domain. The repeating frame results in discrete tones in the frequency domain. Exemplary construction of this defined signal is discussed below.

In embodiments of the invention, measuring the reference delay and/or the reference frequency offset includes analysis of a cross-ambiguity function of the output signal with respect to the defined signal. Measuring the reference delay and/or the reference frequency offset can additionally or alternatively include a joint estimation of the reference delay and the reference frequency offset across a two-dimensional domain, such as where one dimension is the time offset (delay) and the other dimension is the frequency offset. The configuration of the measurement can determine the uncertainty of the reference frequency offset, which can serve advantageously to limit the search range across the frequency offset dimension. The reference delay desirably can also be adjusted according to user preference.

In embodiments of the invention, a search range for the reference frequency offset is either a full range or a fixed partial range of a received signal bandwidth. Searching for the reference frequency offset can be performed until a predetermined match threshold is detected. The frequency search can also begin centered on a previously detected reference frequency offset. The user can also fix the reference frequency offset.

In embodiments of the invention, the time-dependent and/or frequency-dependent variations are obtained by applying one or more mask vectors for suppressing calculation and/or display of invalid data. A mask may be used because only certain tones might be generated in the generator, skipping, for example, the band edge rolloff region and/or the band center "zero frequency" region for practical implementation reasons. A mask may also be used when, during analysis, detecting tones for which the signal to noise ratio is too low to produce valid results. In some parts of the computation, it is desirable to not only suppress display of these frequencies, but to also suppress their contribution to certain calculations.

In embodiments of the invention, inverting a spectrum of the output signal received by the analyzer can be used to compensate for channel paths including spectral inversion.

In embodiments of the invention, the analyzer estimates a signal-to-noise ratio (SNR) of the output signal received by the analyzer.

The analyzer can additionally or alternatively estimate a mismatch in the timing/rate of a signal transmission channel receiver (represented by a dashed line at the output end of channel 45 in FIG. 3) relative to a signal transmission channel transmitter (represented by a dashed line at the input end of channel 45 in FIG. 3) and as affected by, for example, clock rate mismatch or Doppler effect in the signal transmission channel. Received data can be resampled to compensate for the mismatched rate. The sampling rate of the signal transmission channel receiver can also be adjusted to compensate for the mismatched rate.

In embodiments of the invention, a baseline channel reference is computed using at least one computational result of the analyzer while connected to a reference transmission channel. Subsequently, channel characteristics relative to the baseline channel reference can then be computed.

In embodiments of the invention, displayed or recorded results include one or more of: amplitude response (Log Mag), phase response, group delay, impulse response, raw received signal—time-domain (oscilloscope), raw received signal—frequency domain (spectrum analyzer), and frequency offset.

Other objects and advantages will be apparent to those skilled in the art from the following detailed description taken in conjunction with the appended claims and drawings.

DETAILED DESCRIPTION OF THE INVENTION

The present invention provides an apparatus or system, referred to herein as a Vector Channel Analyzer (VCA), and method of operation, which measures signal transmission characteristics of a signal transmission channel by analyzing a signal received at the output of a channel and comparing it to the signal injected into the channel input. The VCA of embodiments of this invention does not require a connected reference between signal input and output analysis components to perform the channel analysis. Instead, in embodiments, the VCA desirably uses a specially constructed stimulus source in combination with robust, precision alignment techniques to measure both magnitude and phase characteristics of the channel without a connected reference.

Figure 1:
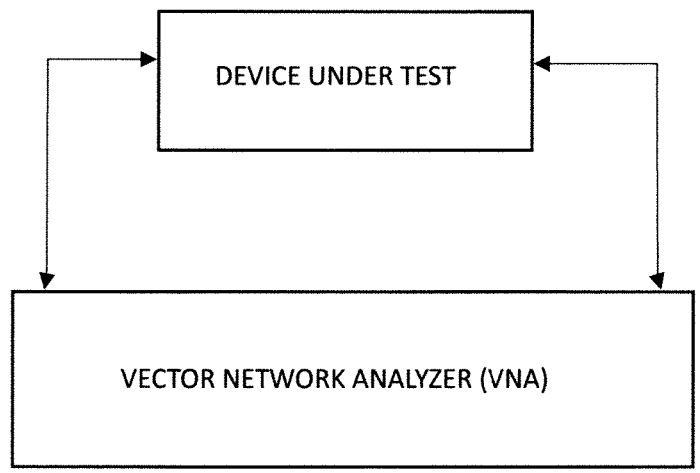
FIG. 1 shows a general representation of a prior art VNA.

FIG. 1 shows a representative prior art VNA, which is typically a precision, multiport analysis tool for characterizing electrical networks. A reference of the stimulus is needed to serve as a phase reference for analysis. The VCA of this invention, as illustrated generally in FIG. 2 for comparison, has important distinctions from a VNA. A VNA will typically perform two types of measurements on a Device Under Test (DUT): transmission and reflection, whereas a VCA of this invention is oriented towards transmission (through) measurements (although the algorithm can also be applied to reflections). A VNA provides both the signal stimulus and analysis in one instrument (or, in some cases, two modules connected by a cabled synchronization reference signal). The stimulus and analysis functions of the inventive VCA are optionally separate and can be housed in two separate and even disparate instruments (e.g., a stimulus generator and a separate analyzer). This allows the VCA to measure the transmission characteristics of systems that are widely separated in location, time, or frequency. The VNA generally makes its measurements one frequency at a time using a CW tone for measurements. In contrast, the VCA of embodiments of this invention fully "loads" the channel band with a wideband source.

Figure 2:
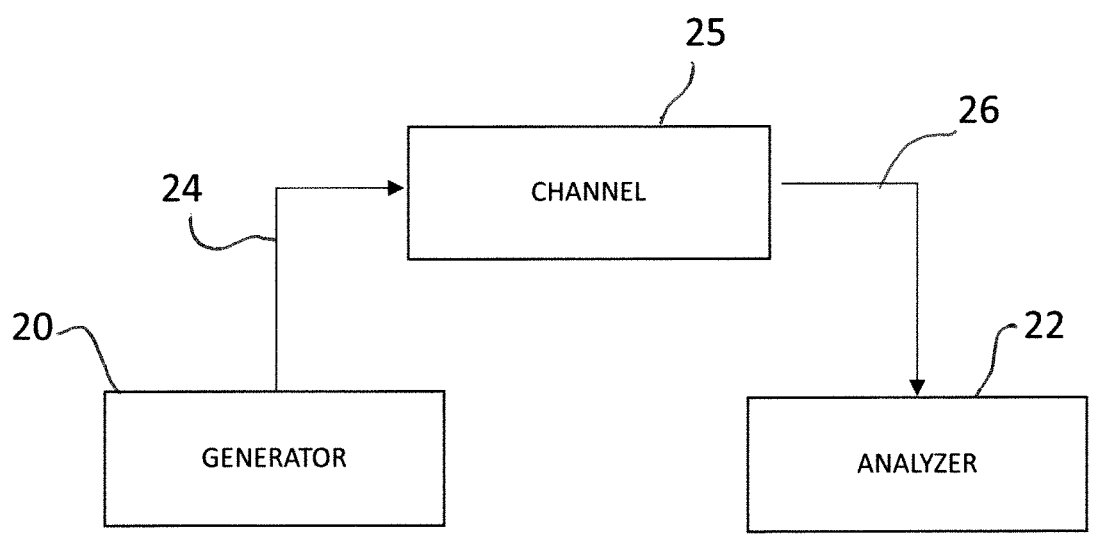
FIG. 2 shows a general representation of a VCA according to embodiments of this invention.

As shown in FIG. 2, a VCA according to embodiments of this invention includes two major components: a source generator 20 connectable at the transmission end of the channel 25 (e.g., the device (channel) under test), and an analysis receiver or analyzer 22 at the receiving end of the channel 25. There is no need to have any connection (e.g., no timing or phase reference connection) between the generator 20 and analyzer 22; however, there is no reason that a single instrument cannot contain both components.

The VCA generator 20 generates a specially constructed stimulus signal based on parameters, which can be or include a reference vector. The construction of the stimulus signal 24 is done in such a way that it facilitates the required analysis. When using parameter-based source signal construction, only a few parameters (e.g., frequency span and resolution) are required to define the stimulus signal using a predetermined algorithm making it easy for the user to configure the analyzer 22 to match the generator 20. The generator 20 is fed into the input of the channel 25 being analyzed.

The analyzer accepts its input 26 from the output of the channel 25 being analyzed. Rather than having a hardwired reference of or from the source, the analyzer 22 only requires either the reference parameters or the static reference vector of the stimulus 24. VCA analysis of embodiments of this invention does not include or assume any synchronization between the received signal 26 and the generator 20, i.e., there may be time and frequency offsets, both of which may be slowly variable.

Figure 3:
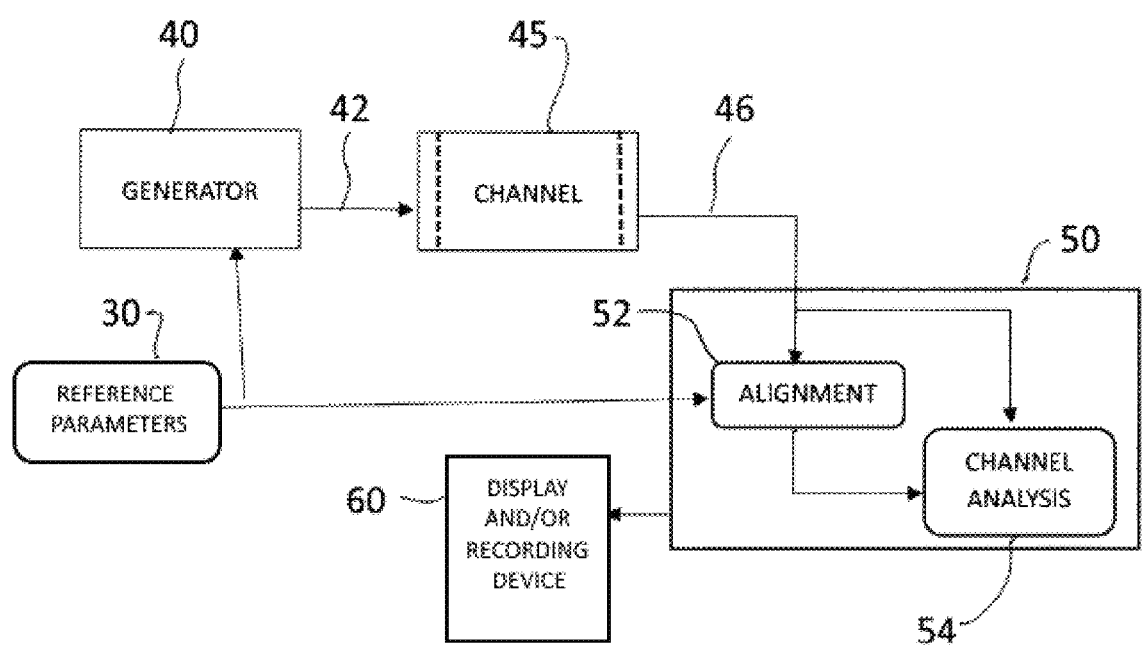
FIG. 3 is a schematic of a VCA according to embodiments of this invention.

The analysis steps of embodiments of this invention include first using the known signal parameters/characteristics to measure any synchronization offsets (time and frequency offsets), and then measuring the response of the channel with respect to these offsets. Referring to FIG. 3, user defined reference parameters 30 are provided to both a generator 40 and an analyzer 50. The generator 40 constructs a defined signal 42 as a function of the reference parameters 30 and injects the defined signal 42 into an input of the signal transmission channel 45. The analyzer 50 receives the output signal 46 at or from an output of the signal transmission channel 45. A reference delay and/or a reference frequency offset for the output signal is determined at module 52 within the analyzer 50. In preferred embodiments the delay and/or offset is determined by the analyzer 50 without any timing or phase reference connection with the generator 40. The analyzer 50 does not know the exact signal or the time the generator 40 injected the signal, but instead identifies an injected signal (which has changed through the channel 45) using the original reference parameters used to generate the signal. The analyzer 50 then computes a transfer function 54 of the signal transmission channel 45, represented as time-dependent (impulse response) and/or frequency-dependent (frequency response) characteristics of the signal transmission channel, calculated with respect to the reference delay and the reference frequency offset. The results are output to a display and/or recording device 60.

The basic measurements provided by the VCA of embodiments of this invention are the magnitude and phase of the transfer function of the channel across its band. The VCA can also compute group delay across the band and the time-domain response of the channel. The collateral synchronization offsets may also provide useful information.

The VCA source generator is typically configured by specifying the frequency span and resolution to be analyzed. Inside the VCA source generator, the VCA signal is constructed as a digital signal at baseband according to a predetermined VCA signal construction algorithm known to both the generator and analyzer. The signal is then converted to a frequency (RF, IF, or baseband) and signal level suitable for applying it to the input of the channel to be analyzed.

At the receiving end of the channel, the VCA analyzer is configured to accept the frequency and amplitude level of the VCA signal. The VCA analyzer is configured with the same span, resolution, and signal parameters used by the VCA source generator. The VCA analyzer processes the signal first to obtain time, frequency, and (optionally) time-scaling (Doppler) offsets with reference to its reconstructed source. VCA analysis results, including Log Mag Amplitude, Phase, Group Delay, Time Response, and other results are computed depending on the processing selected by the user. The VCA uses highly efficient algorithms and processing to give wideband, high-resolution results at near real-time speeds.

In embodiments of this invention the defined signal injected by the generator is constructed of a repeating fixed frame in the time domain with frame length or period equal to T, and thus composed of discrete tones in the frequency domain with spacing 1/T. This parameter (either the frame length or the corresponding tone spacing) determines the analysis resolution of the analyzer. The parameter can be chosen such that is gives sufficient resolution in the frequency domain, and also that the time frame more than spans the impulse response of the channel to be measured. In practice, many factors affect the length of the impulse response to be measured. Very generally, the impulse response typically follows at least the reciprocal of the bandwidth of any filters in the channel under test. Another impact on the impulse response is in multipath cases, where the impulse response must cover the span of the path propagation times.

In order to facilitate analysis, it can be desirable to construct the defined input signal with certain traits. For example, it is often important that each individual frequency domain tone has sufficient energy for accurate measurements. Simply choosing a random vector as a time-domain frame will result in random amplitudes of each tone in the frequency domain. Some of these tones may well be very low amplitude and therefore unsuitable for measurement. In order to have more uniform coverage of the frequency band being measured, the signal can be constructed in the frequency domain.

The generator signal can be specified as a series of tones, spaced at the desired resolution, with a specified amplitude profile across the band of interest. The phase of each tone should also be unambiguously defined. Exemplary tone phase construction will be discussed below. Given the amplitude and phase of each comprised tone, the time domain signal is therefore defined and can be constructed. One or a small number of time frames are created, and then repeated as the generated source.

With a given amplitude profile of the tone series, the choice of the phases of the tones will also very much affect the shape of the signal time domain. Any phase profile is theoretically possible to use in the VCA, but there will be practical considerations of each choice, especially with regards to the Peak-to-Average Ratio (PAR) of the resulting time domain signal. If a low PAR is desired, there are techniques to construct the signal with improved PAR. The following describes resulting time-domain signal characteristics for several choices of the phase profile.

| Phase Profile | Peak-to-Average Ratio (PAR) | Comments |
| --- | --- | --- |
| Uniform | Very high (worst case) | All tones having the same phase in the frequency domain will result in a time domain signal frame that is an impulse. |
| Zadoff-Chu (ZC sequence) | Very low (1.0) | The magnitude of a ZC sequence is constant in the time domain. However, in the analysis stage, a time shift is indistinguishable from a frequency shift, making ZC sequences less ideal. |
| Pseudo Random | Moderate (typically about 6.0) | In many cases, this makes an ideal VCA signal. However, channels will be subjected to moderate PAR signals. |
| Optimized | Low (1.0 to 2.5) | Channel phases chosen using optimization techniques to minimize PAR. |

In embodiments of this invention, the analyzer has the capability of processing an instantaneous bandwidth centered at a tuned center frequency. Complex IQ processing is assumed for the example below, but the analysis could theoretically be done on real-only data, and theoretically either on digital or analog signals. Exemplary analysis steps include (not necessarily in order, and not all steps may be necessary depending on the desired analysis):

1. Collect N frames of received signals, with N at least 2 and preferably more.
2. Create local copies of stimulus in both time- and frequency-domain.
3. (If Doppler or similar factors make it necessary) Find exact pattern length of received signal. This can be done using an autocorrelation.

a. If needed, adjust processing by either:
   i. Changing sampling rate of acquisition system; or
   ii. Resampling the data algorithmically (such as using techniques disclosed in U.S. Pat. No. 7,952,396, herein incorporated by reference).
4. Align to frequency bin (tone) center. This can be done with a delay-and-multiply (homodyne) technique with the delay set to the frame length. The phase difference of the delay-and-multiply output can be used to determine the necessary frequency correction. After correction, the signal will be centered on a tone (although not necessarily the correct tone).
5. Compute average time-domain frame of N frames.
6. If N (the number of frames being analyzed) is at least 2, the SNR can be computed by comparing average frame (signal) to the residual calculated by subtracting the average frame from each un-averaged frame.
7. Time and frequency offset measurement and correction. The magnitude peak of the two-dimensional cross-ambiguity function can be used to find these reference offsets.
8. Compute transfer function in frequency domain. The transfer function is most easily computed in the frequency domain. For each tone/bin, the response is the averaged received signal divided by the transmitted reference. As these are both complex values, the magnitude and phase of the response is obtained.
9. Compute derivative measurements (Log Mag, time domain, phase unwrapping, group delay)

The independence of the stimulus and analysis functions according to this invention enable many measurements that would be difficult or impossible with other instruments. As a first example, the VCA of embodiments of this invention can be used for characterization of the RF and IF signal path of a heterodyne radio. Radio receivers are sometimes used to downconvert a radio frequency (RF) signals to an intermediate frequency (IF) for digitization or further processing. Radio manufacturers typically only generally characterize the IF filter chain in terms of signal bandwidth. However, IF filters are analog filters with inherently non-linear phase characteristics and may introduce substantial group delay distortion. The VCA provides an easy way to characterize the entire signal chain from antenna input to IF filter output. Simply configure the source to supply the RF antenna input, and tune the VCA analysis receiver to the IF output. The VCA will characterize the effects of the entire RF-IF signal path.

As a second example, the VCA of embodiments of this invention can be used for characterization the passband characteristics of a RF digital recorder. The characterization of digital RF signal paths is normally the realm of the DSP engineer that designs the digital filters and other processing modules. However, sometimes an unknown digital system must be characterized. Digital systems invariably interface to analog systems at some point, and those interfaces are subject to distortions and degradation. Because the VCA can operate even with large bulk delays, and because either or both the VCA source the analysis can have a digital interface, the VCA makes an ideal tool for the characterization of digital systems.

As a third example, the VCA of embodiments of this invention can be used for characterization a terrestrial microwave link. In addition to being composed of multiple analog (and sometimes digital) components in the signal chain, microwave links are subject to multipath and other propagation effects. Microwave links span distances of tens or even hundreds of kilometers, making traditional network analysis unrealistic. Again, the VCA is ideally suited to this application. With a VCA source at the transmit end of the link, the entire link can be characterized very quickly and accurately. The VCA even enables real-time analysis while adjustments are being made for the optimum provisioning workflow.

As a fourth example, the VCA of embodiments of this invention can be used for characterization a satellite transponder in orbit, making use of the unique capabilities of the VCA is to measure the signal paths of equipment in orbit, either for initial functional verification or for characterization of performance degradation over time. The long path distances and resulting delays involved pose no hindrance to the VCA analysis. Even the large dynamic Doppler shift arising from low earth orbit dynamics can be characterized and compensated.

Thus, the invention provides an improved system and method that measures signal transmission characteristics of a channel without requiring a connected reference between signal input and output analysis components. The specially constructed stimulus source and precision alignment techniques to measure both magnitude and phase characteristics of the channel allow for more flexibility of the system, such as for analysis of long range transmission channels.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for measuring characteristics of a signal transmission channel, the method comprising:
   receiving user defined reference parameters at a generator connectable with the signal transmission channel;
   receiving the user defined reference parameters at an analyzer connectable with the signal transmission channel;
   constructing, by the generator, a defined signal as a function of the user defined reference parameters;
   injecting the defined signal into an input of the signal transmission channel;
   receiving an output signal with the analyzer at an output of the signal transmission channel;
   determining a reference delay and/or a reference frequency offset for an output signal at the analyzer without any timing or phase reference connection with the generator;
   computing, by the analyzer, a transfer function of the signal transmission channel, represented as time-dependent and/or frequency-dependent characteristics of the signal transmission channel, calculated with respect to the reference delay and the reference frequency offset; and
   displaying or recording results of the computing.

2. The method of claim 1, wherein the user defined reference parameters comprise frequency span and resolution.

3. The method of claim 1, wherein the defined signal comprises a repeating fixed frame in a time domain and resulting discrete tones in a frequency domain.

4. The method of claim 1, wherein measuring the reference delay and/or the reference frequency offset comprises analysis of a cross-ambiguity function of an output signal with respect to the defined signal.

5. The method of claim 1, wherein measuring the reference delay and/or the reference frequency offset comprises a joint estimation of the reference delay and the reference frequency offset across a two-dimensional domain.

6. The method of claim 1, further comprising adjusting the reference delay according to user preference.

7. The method of claim 1, wherein a search range for the reference frequency offset is either a full range or a fixed partial range of a received signal bandwidth.

8. The method of claim 1, further comprising searching for the reference frequency offset until a predetermined match threshold is detected.

9. The method of claim 8, wherein a frequency search begins centered on a previously detected reference frequency offset.

10. The method of claim 1, wherein the reference frequency offset is fixed by a user.

11. The method of claim 1, wherein the computing, by the analyzer, the time-dependent and/or frequency-dependent characteristics comprises applying one or more mask vectors for suppressing calculation and/or display of invalid data.

12. The method of claim 1, further comprising inverting a spectrum of the output signal received by the analyzer to compensate for channel paths including spectral inversion.

13. The method of claim 1, further comprising estimating a signal-to-noise ratio (SNR) of the output signal received by the analyzer.

14. The method of claim 1, further comprising estimating a mismatch in a timing rate of a signal transmission channel receiver relative to a signal transmission channel transmitter and as affected by Doppler effect in the signal transmission channel.

15. The method of claim 14, further comprising resampling received data to compensate for a mismatched rate.

16. The method of claim 14, further comprising adjusting a sampling rate of the signal transmission channel receiver to compensate for a mismatched rate.

17. The method of claim 1, further comprising computing a baseline channel reference using at least one computational result of the analyzer while connected to a reference transmission channel, and thereafter computing channel characteristics relative to the baseline channel reference.

18. The method of claim 1, wherein displayed or recorded results comprise one or more of: an amplitude response (LogMag), a phase response, a group delay, an impulse response, a raw received signal-time-domain (oscilloscope), a raw received signal-frequency domain (spectrum analyzer), and a frequency offset.

19. A system for measuring characteristics of a signal transmission channel, comprising:
  a generator configured to: generate a defined signal as a function of user defined reference parameters; and inject the defined signal into an input of the signal transmission channel;
  an analyzer configured to: receive the defined signal from an output of the signal transmission channel, wherein the analyzer includes the user defined reference parameters;
  measure a reference delay and a reference frequency offset without any timing or phase reference synchronization with the generator; and compute a time-dependent and/or a frequency-dependent variation of a response of the signal transmission channel relative to the reference delay and the reference frequency offset; and
  a display and/or recording device configured to receive results of the analyzer computations.

* * * * *